United States Patent
Choo et al.

(10) Patent No.: US 11,384,915 B1
(45) Date of Patent: Jul. 12, 2022

(54) GARNISHLESS TYPE HIDDEN LAMP FOR VEHICLE

(71) Applicants: Hyundai Motor Company, Seoul (KR); Kia Corporation, Seoul (KR); SL Corporation, Daegu (KR)

(72) Inventors: Dong-Hoon Choo, Gwacheon-si (KR); Seung-Pyo Hong, Incheon (KR); Yeong-Han Park, Gyeongsan-si (KR); Su-Jung Lee, Daegu (KR); Dae-Han Bae, Daegu (KR)

(73) Assignees: Hyundai Motor Company, Seoul (KR); Kia Corporation, Seoul (KR); SL Corporation, Daegu (KR)

( * ) Notice: Subject to any disclaimer, the term of this patent is extended or adjusted under 35 U.S.C. 154(b) by 0 days.

(21) Appl. No.: 17/523,640

(22) Filed: Nov. 10, 2021

(30) Foreign Application Priority Data

Mar. 12, 2021 (KR) .................... 10-2021-0032768

(51) Int. Cl.
*F21S 41/275* (2018.01)
*B60Q 3/54* (2017.01)
*F21S 41/16* (2018.01)

(52) U.S. Cl.
CPC .............. *F21S 41/275* (2018.01); *B60Q 3/54* (2017.02); *F21S 41/16* (2018.01)

(58) Field of Classification Search
CPC .......... B60Q 3/50–57; F21S 41/10–176; F21S 41/275
See application file for complete search history.

(56) References Cited

U.S. PATENT DOCUMENTS 10,443,807 B2 * 10/2019 Herrmann ............ B60Q 1/2619

FOREIGN PATENT DOCUMENTS

JP  6221589 B2  11/2017

\* cited by examiner

*Primary Examiner* — Jason M Han
(74) *Attorney, Agent, or Firm* — Morgan, Lewis & Bockius LLP (57) ABSTRACT

A garnishless type hidden lamp applied to a vehicle, may include a light source module, in which an internal lens spaced from an external lens, appearing as a garnish from outside thereof due to a color of a penetrable painting portion which reflects the external light, with an air gap interposed therebetween transmits an internal light of a light source through laser perforation holes to form a laser pattern on the external lens, so that the garnishless type hidden lamp may have the sense of unity with vehicle design by a painting garnish function of the external lens without combination with a separate metal garnish, improve a wow effect using the painting garnish, implement differentiated and customized lighting by only changing the laser pattern.

20 Claims, 6 Drawing Sheets

FIG.1

HIDDEN LAMP BOUNDARY LINE

← LENS LIGHT PENETRATION PATH
←--- LENS LIGHT BLOCKING PATH

<SECTION A-A>

FIG.2

<PARTIALLY-ENLARGED VIEW OF A>

GARNISHLESS TYPE HIDDEN LAMP FOR VEHICLE

CROSS-REFERENCE TO RELATED APPLICATION

The present application claims priority to Korean Patent Application No. 10-2021-0032768, filed on Mar. 12, 2021, the entire contents of which is incorporated herein for all purposes by this reference.

BACKGROUND OF THE INVENTION

Field of the Invention

The present invention relates to a hidden lamp, and specifically, to a garnishless type hidden lamp for a vehicle which does not use a garnish due to a light source module that doubles as the garnish.

Description of Related Art

Recently, design performance of vehicles, which is increasing in importance, has been combined with the development of autonomous vehicles along with the commercialization of electric vehicles, and the design of a vehicle lamp system is further strengthening in addition to the function and performance thereof.

One example which reflects the present lamp system trend is a hidden lamp (or a hidden lighting). As an example, the hidden lamp may function as a lamp in the nighttime and look like the front or rear appearance (for example, a metal garnish) of a vehicle in the daytime when the light source is turned off, implementing a sense of unity with the vehicle design.

To the present end, the hidden lamp includes a lamp module hidden inside of a metal garnish externally exposed among garnishes, and reinforces a design image on the metal garnish, so that a hidden lamp effect may be simultaneously implemented with a design effect.

However, a structure in which the hidden lamp is combined with the metal garnish is restricted in implementing the hidden lamp or lighting effect due to the metal garnish.

First, when the lamp is turned off, a light source module, etc. which forms an internal structure of the hidden lamp, is exposed to the outside, and a laser pattern formed in an external lens of the light source module is also exposed to the outside, which limits the hidden lamp effect. Second, the metal garnish may express only achromatic colors due to external exposure of a metal deposition, which makes it impossible to implement various colors. Third, the hidden lamp may be applied to only the metal garnish type, which causes a decline in the degree of freedom.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a garnishless type hidden lamp for a vehicle, in which an external lens of a light source module functions as a painting garnish, so that it is possible to implement a garnish having a sense of unity with a vehicle design without applying a separate metal garnish, and light of a lamp penetrates the external lens without scattering from the external lens using an air gap as an air layer, so that it is possible to implement a wow effect of the painting garnish with a laser pattern of an internal lens clearly visible outside in the nighttime when the lamp is turned on, and to implement differentiated and customized lighting by only changing the laser pattern without changing the appearance of the garnishless type hidden lamp.

A garnishless type hidden lamp for vehicle according to various exemplary embodiments of the present invention for achieving the object includes: an external lens including a penetrable painting portion which reflects an external light so that the external lens looks like a garnish when seen outside thereof; an internal lens disposed adjacent to the external leans and including laser perforation holes which transmit an internal light to the external lens; and a light source configured to generate the internal light.

In various exemplary embodiments of the present invention, the external lens and the internal lens are spaced from each other with an air gap interposed therebetween.

In various exemplary embodiments of the present invention, the air gap is set to have an air gap optimum space, and the air gap optimum space is a distance that prevents the external light penetrating the external lens from scattering from the laser perforation holes and prevents the internal light exiting from the laser perforation holes from scattering from the external lens.

In various exemplary embodiments of the present invention, the air gap is set as an air gap reduction space shortened by the distance in the air gap optimum space or an air gap expansion space lengthened by the distance in the air gap optimum space, and the air gap reduction space scatters a part of the external light in the laser perforation holes to blur a shape of the laser perforation holes on the external lens, while the air gap expansion space scatters a part of the internal light exiting from the laser perforation holes to blur a design of the laser perforation holes on the external lens.

In various exemplary embodiments of the present invention, the external lens includes a transparent lens portion made of a transparent material and configured to form external visibility for the penetrable painting portion, and the transparent lens portion forms a boundary surface which is placed opposite to an external exposed surface onto which the external light is incident, between the penetrable painting portion and the transparent lens portion, and paint color painting which transmits and reflects the external light is applied to the penetrable painting portion.

In various exemplary embodiments of the present invention, the internal lens includes a transparent lens portion made of a transparent material and configured to transmit the internal light, and a laser pattern portion disposed in the transparent lens portion and having the laser perforation holes processed as a laser pattern.

In various exemplary embodiments of the present invention, the laser pattern portion includes a light blocking portion and a blocking painting portion, and the light blocking portion passes the internal light through the laser perforation holes while reflecting the internal light at a boundary surface formed between the transparent lens portion and the light blocking portion, and the blocking painting portion passes the internal light through the laser perforation holes while absorbing the internal light at a boundary surface formed between the light blocking portion and the blocking painting portion.

In various exemplary embodiments of the present invention, paint color painting which reflects the internal light is applied to the light blocking portion, and black painting which absorbs the internal light is applied to the blocking painting portion.

In various exemplary embodiments of the present invention, the paint color painting is any one of a black painting, a white painting, and a light gray painting.

In various exemplary embodiments of the present invention, the light blocking portion is formed on the transparent lens portion by deposition, and chromium (Cr) or aluminum (AL) is applied to the deposition.

In various exemplary embodiments of the present invention, the internal lens includes a transparent lens portion made of a transparent material and configured to transmit the internal light, a blocking painting portion disposed in the transparent lens portion and having the laser perforation holes processed as a laser pattern, and a retro reflection portion positioned between the transparent lens portion and the blocking painting portion and configured to form a boundary surface.

In various exemplary embodiments of the present invention, the retro reflection portion is integrally formed with the transparent lens portion.

In various exemplary embodiments of the present invention, the plurality of laser perforation holes form a perforation row and forms a laser pattern.

Furthermore, a vehicle according to various exemplary embodiments of the present invention for achieving the object includes: a garnishless type hidden lamp including a light source module, in which an internal lens spaced from an external lens, appearing as a garnish from outside thereof due to a color of a penetrable painting portion which reflects the external light, with an air gap interposed therebetween passes an internal light of a light source through laser perforation holes to form a laser pattern on the external lens, and a back cover configured to totally reflect the internal light from the inside of a lamp housing; and a bumper having the garnishless type hidden lamp disposed thereon.

In various exemplary embodiments of the present invention, the garnishless type hidden lamp has a shape matched with the shape of the bumper, and is positioned below the bumper, and the bumper is a front bumper.

A garnishless type hidden lamp or a garnishless type hidden lighting of the present invention implements the following operations and effects.

First, a garnishless type hidden lamp or a garnishless type hidden lighting may be implemented without applying a separate metal garnish because a light source module implements a garnish function with a paint painting lens and black painting lens. Second, a laser pattern and a lamp internal structure may have an excellent external exposure blocking function even if the thickness of the color paint painting is reduced by use of the black painting for the hidden lamp. The capacity reduction of a light-emitting diode (LED) light source is possible by reducing the thickness of the color paint painting, which makes it possible to reduce the cost of the lamp and improve the fuel economy of a vehicle. Third, it is possible to improve optical efficiency due to light recycling as well as internal light blocking obtained by reflecting light from the black painting lens in an internal space of the lamp. By reducing the thickness of the black painting, defects of laser perforation holes due to the difference in thickness between the lens and the painting are reduced, which makes it possible to shorten a process time for the laser perforation holes.

Furthermore, a vehicle to which a garnishless type hidden lamp or a garnishless type hidden lighting of the present invention is applied implements the following operations and effects First, due to the light reflection of paint/black painting applied to a lens instead of a metal garnish, it is possible to implement a painting garnish integrated with a vehicle design when a lamp is turned off, to implement the wow effect by a light source when a lamp is turned on, and to implement lighting differentiated and customized according to a driver's preference by use of various laser patterns of the lens. Second, it is possible to optimize the light focusing and internal visibility of the hidden lamp due to the garnishless type hidden lamp or hidden lighting. The degree of design freedom for the lamp and periphery thereof may be improved by exposing, to the outside, the paint color painting configured for implementing various colors. Third, various colors may be implemented by the garnishless type hidden lamp, so that the hidden lamp may be applied to painting of color of a vehicle body such as a bumper. Forth, the garnishless type hidden lamp or hidden lighting may be applied to an electric vehicle, etc., so that it is possible to approach closer to the technology of implementing invisible lamps.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, of the present invention an exemplary embodiment of the present invention will be described in detail with reference to the accompanying exemplary drawings. The exemplary embodiment represents an example and may be implemented in various different forms by those skilled in the art to which various exemplary embodiments of the present invention pertains, and thus is not limited to the exemplary embodiment described herein.

Figure 1:
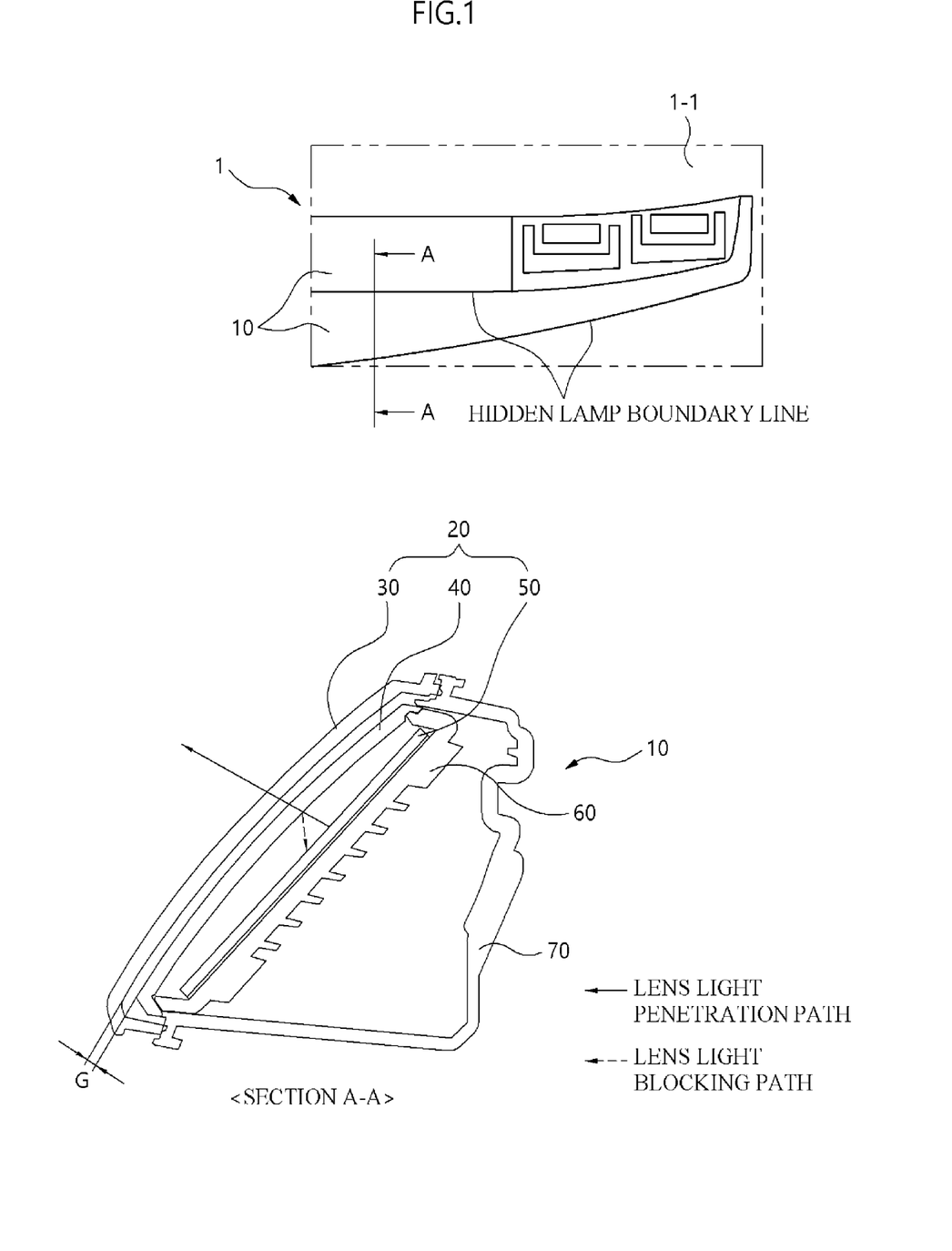
FIG. 1 is a schematic diagram illustrating a garnishless type hidden lamp applied to a vehicle according to various exemplary embodiments of the present invention.

Referring to FIG. 1, a vehicle 1 includes a garnishless type hidden lamp 10 which is elongated along the width of a bumper 1-1. In the instant case, the garnishless type hidden lamp 10 means a hidden lighting.

As an example, the bumper 1-1 is a front bumper or a rear bumper. In the instant case, the bumper 1-1 may include a fog lamp or a turn signal lamp.

The garnishless type hidden lamp 10 includes a light source module 20 including an external lens 30, an internal lens 40 and a light source 50, a back cover 60, and a lamp housing 70.

As an example, when the light source 50 is turned off (for example, in the daytime), the external lens 30 reflects external light (for example, sunlight or external lighting) to the outside to form an outside exposure portion with a texture as in a metal garnish, and when the light source 50 is turned on (for example, in the nighttime), and transmits light exiting from the light source 50 to emit the light to the outside, which makes it possible for the garnishless type hidden lamp 10 to function as a lamp.

The garnishless type hidden lamp 10 may form a garnish boundary on the bumper 1-1 by forming a hidden lamp boundary.

As an example, the internal lens 40 is positioned behind the external lens 30 with an air gap G between the internal lens 40 and the external lens 30 in an internal space of the lamp. The internal lens 40 is configured to reflect, to the external lens 30, some external lights (for example, sunlight or external lighting) penetrating the external lens 30 when the light source 50 is turned off (for example, in the daytime), and to transmit, to the external lens 30, light exiting from the light source 50 by passing the light when the light source 50 is turned on (for example, in the nighttime).

As an example, the light source 50 is located between the internal lens 40 and the back cover 60 in the internal space of the garnishless type hidden lamp 10 and is turned on in a response to a lamp lighting signal, and generates light as internal light. As the light source 50, a light emitting diode (LED) is applied, but a bulb may be also applied. In the instant case, the LED is connected to a printed circuit board (PCB) forming an LED circuit portion. The lamp lighting signal is a general lamp ON or OFF signal generated from a cluster of driver's seat which is not illustrated or a lamp button which is provided on a steering wheel and not illustrated.

The light source 50 is configured as a surface light source in line with the length of the internal lens 40, and the entire shape thereof is matched with the shape of the garnishless type hidden lamp 10.

Furthermore, in a state in which paint painting or black painting is applied to the external lens 30 and the internal lens 40, a distance of the air gap G for reflecting external light and transmitting internal light is optimized. Unlike the external lens 30, a laser pattern 47-1 (refer to FIG. 2) may be formed in the internal lens 40, which causes various changes in a shape recognized outside.

As an example, the back cover 60 totally reflects, toward the internal lens 40, light of the light source 50 and light returning from the internal lens 40. In the instant case, the back cover 60 forms an assembly structure in which the internal lens 40 and the light source 50 are coupled.

As an example, the lamp housing 70 forms the internal space of the lamp as an assembly structure in which is coupled to the external lens 30, accommodates the internal lens 40 and the back cover 60 in the internal space, forms a rear portion of the garnishless type hidden lamp 10, and accordingly, is coupled to a portion of the bumper in the internal space of the bumper 1-1.

Figure 6:
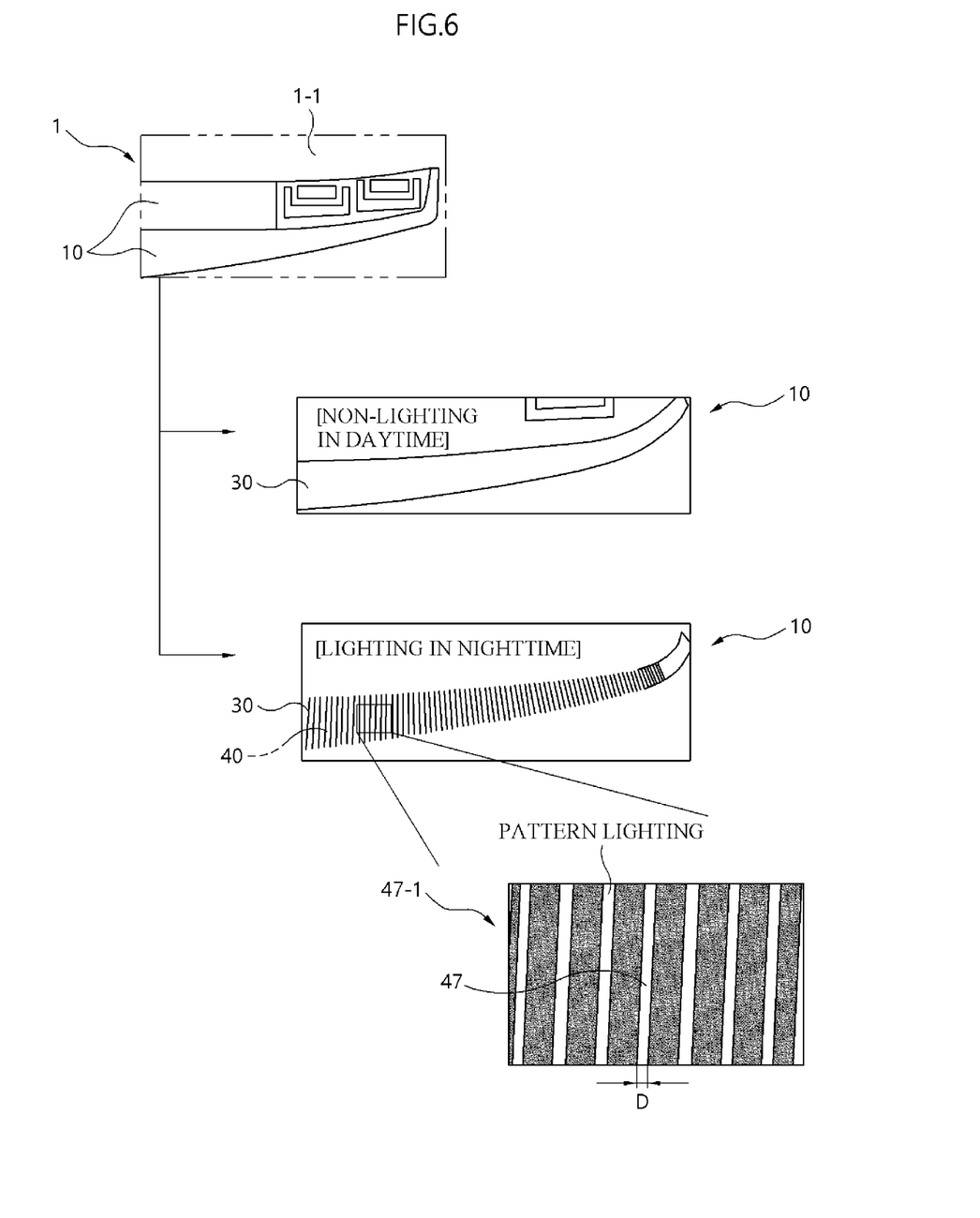
FIG. 6 is a diagram illustrating an example in which the garnishless type hidden lamp according to various exemplary embodiments of the present invention is operated on a vehicle.

Furthermore, the garnishless type hidden lamp 10 is formed in a shape which is matched with the shape of the bumper 1-1 to implement a sense of unity with the front design of the vehicle. The external lens 30, or the external lens 30 and internal lens 40 are located below the bumper 1-1 as illustrated in FIG. 6.

Therefore, the garnishless type hidden lamp 10 applied to the bumper 1-1 is elongated along the width of a bumper 1-1, and has both left and right end portions whose widths are gradually decreased compared to the width of the central section thereof. In the instant case, the entire external shape of the external lens 30 may vary depending to the type of bumper or vehicle design suitability.

Figure 2:
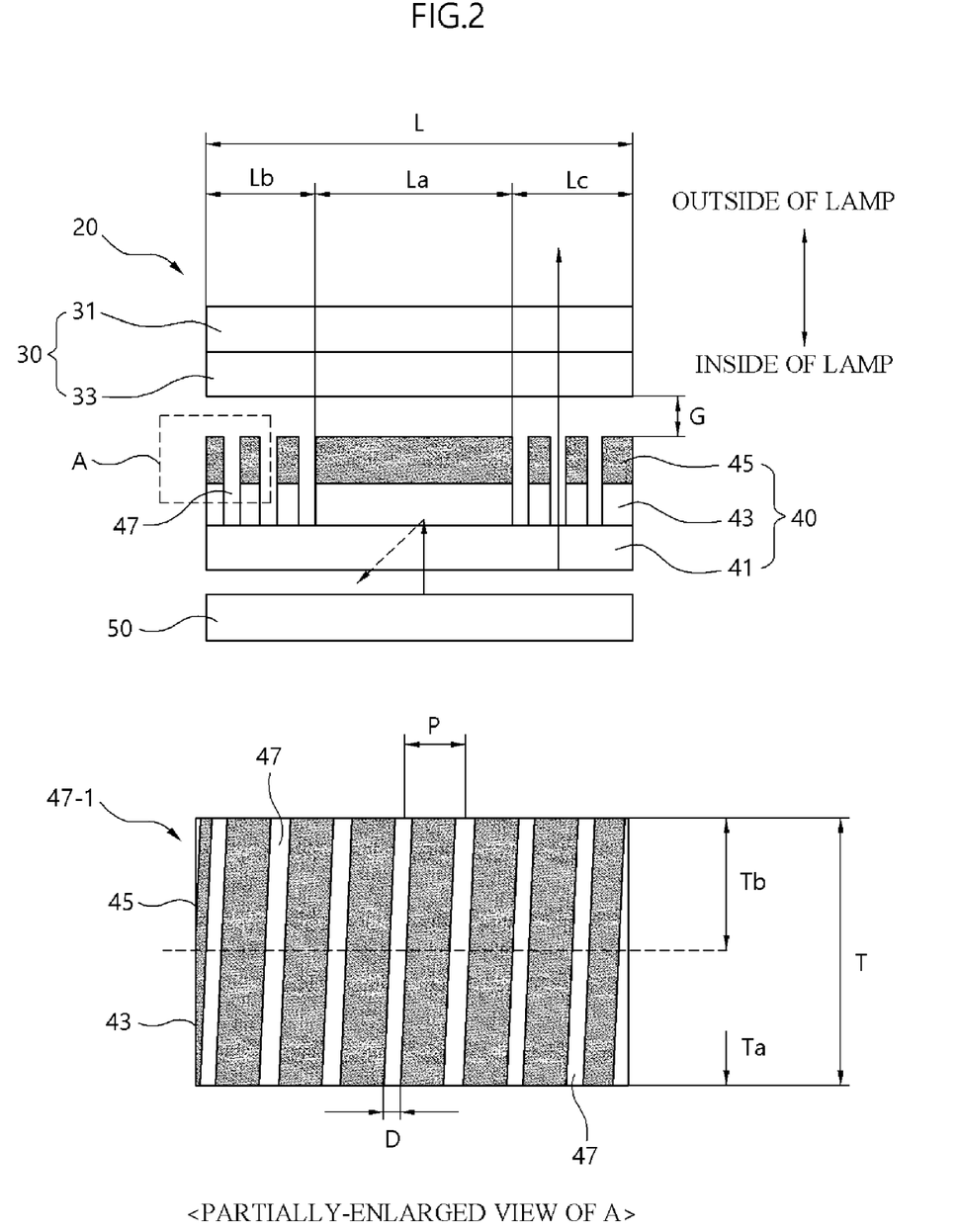
FIG. 2 is a schematic diagram illustrating a light source module of the garnishless type hidden lamp according to various exemplary embodiments of the present invention.

Meanwhile, FIG. 2 shows detailed structures of the external lens 30 and the internal lens 40 which constitutes of the light source module 20.

The external lens 30 includes a transparent lens portion 31 and a penetrable painting portion 33. In the instant case, a thickness of a lens of the transparent lens portion 31 is set to match rigidity of the lens, and a thickness of a painting of the penetrable painting portion 33 is appropriately set to match the thickness of the lens.

As an example, the transparent lens portion 31 is formed in a transparent state by use of any one of polycarbonates (PC), polymethyl methacrylate (PMMA), and glass, and has a front surface formed as an outside exposure surface, and a rear surface used as a painting surface. The penetrable painting portion 33 is a paint painting having penetrability, and is painted or applied on the rear surface of the transparent lens portion 31 in various colors expressed by paint. In the instant case, light (that is, light of the light source 50) penetrating the penetrable painting portion 33 performs a lamp function (for example, a position) in the transparent lens portion 31, improving night visibility as a lamp.

Therefore, the external lens 30 functions as a painting garnish whose outside visibility is formed by the penetrable painting portion 33 through the transparent lens portion 31, implementing a sense of unity with a vehicle design even without applying a metal garnish, and implementing a variety of effects, compared to a single effect of the metal garnish, due to a variety of colors of the penetrable paint applied to the penetrable painting portion 33.

The internal lens 40 includes a transparent lens portion 41, laser pattern portions 43 and 45, and the laser pattern 47-1.

In the instant case, a thickness of a lens of the transparent lens portion 41 is set to match rigidity of the lens, and a thickness of a painting of the laser pattern portions 43 and 45 are appropriately set to match the thickness of the lens.

As an example, the transparent lens portion 41 is formed in transparent state using any one of polycarbonates (PC), polymethyl methacrylate (PMMA) and glass, and has a front surface formed as a double painting surface of a light blocking portion 43 and a blocking painting portion 45 and a rear surface facing the light source 50.

The laser pattern portions 43 and 45 includes the light blocking portion 43 and the blocking painting portion 45, and the laser perforation holes 47 processed to form the laser pattern 47-1.

As an example, the light blocking portion 43 forms an effective hiding effect by being painted or applied onto the front surface of the transparent lens portion 41, and blocks internal light due to the thickness of the light blocking portion 43, reflecting the light of the light source 50 in the internal space of the lamp, and reinforcing a role (for example, B side of the transparent lens part) of the rear surface of the blocking painting portion 45. In the instant case, due to light reflected by blocking the internal light, the light of the light source 50 is reused through total reflection of the internal lens 40 and the back cover 60, improving optical efficiency and lowering the light source specification with the same amount of light, so that the heat generation rate may also be reduced by the amount of reused light.

The light blocking portion 43 may be formed by any one of a metal deposition method using chromium (Cr), aluminum (AL), etc. a repetition rate (RR) shape method, and a paint color method. In the instant case, any one of white, blue and light gray colors is applied as the paint.

Furthermore, the blocking painting portion 45 is divided into a front surface (that is, A side of the black painting) facing the penetrable painting portion 33 of the external lens 30 and the rear surface (that is, B side of the black painting) of the blocking painting portion 45, and the front surface (that is, A side of the black painting) absorbs the external light entering through the external lens 30 when the light source 50 is turned off, while the rear surface (that is, B side of black painting) is configured to block the internal light when the light source 50 is turned on. In the instant case, black painting or a black bezel is applied to the blocking painting portion 45.

As an example, the laser pattern 47-1 is formed by a plurality of laser perforation holes 47 formed in the light blocking portion 43 and the blocking painting portion 45, and the laser perforation holes 47 transmit the light of the light source 50 to secure optical performance. In the instant case, the laser perforation holes 47 may each have a diameter of about 0.25 mm as an optimized diameter.

Furthermore, an air gap G formed by the external lens 30 and the internal lens 40 lowers outside visibility of the laser pattern 47-1 of the internal lens 40 by scattering the external light penetrating and the external lens 30. Therefore, the laser pattern 47-1 of the internal lens 40 is hardly seen outside through the external lens 30 in the daytime when the light source 50 is turned off. In the instant case, the air gap G may have a distance of about 1.5 mm as an optimized distance.

Furthermore, the plurality of laser perforation holes 47 have a perforation hole row (or a perforation hole group) and form the laser pattern 47-1. A partial length of the total lens length L of the internal lens 40 is determined as a perforation hole unformed section La, and does not have the perforation hole rows (or perforation hole groups), which causes the light blocking portion 43 to block and reflect light. Both sides of the perforation hole unformed section La are left and right perforation hole formation sections Lb and Lc, which causes light to pass through the laser perforation holes 47.

The left perforation hole formation section Lb and the right perforation hole formation section Lc preferably have the same length and number of holes, but a pattern change effect may be achieved in the total lens length L by use of different lengths and numbers of holes. Furthermore, the total lens length L may be constituted by the left and right perforation hole formation sections Lb and Lc without forming the perforation hole unformed section La as shown in FIG. 6 by processing the laser perforation holes 47 in the perforation hole unformed section La.

Furthermore, the laser perforation holes 47 may be formed vertically or obliquely at an acute angle to control the amount of light which is transmitted.

Referring to the section A-A, a ratio between thicknesses of the light blocking portion 43 and the blocking painting portion 45 may cause a laser processing operation to be more easily conducted, by adjusting a ratio between a depth Ta of a blocking portion and a depth Tb of a painting portion with respect to the total laser depth T.

As an example, by reducing the depth Tb of the painting portion compared to the depth Ta of the blocking portion and thus reducing the thickness of the blocking painting portion 45, it is possible to shorten a time required for processing the laser perforation holes and reduce the defect rate of the laser processing, that is, reduce the defect rate of the laser perforation holes due to thickness difference. In the instant case, a degree of reduction in the depth Tb of the painting portion may set the percent ratio (Tb/Ta) between the depth Ta of the blocking portion and the depth Tb of the painting portion to about 40/60%.

Referring to the cross section A-A, the laser perforation holes 47 forms a hole pitch P with respect to a hole diameter D, and the hole pitch P is set to 1D to 2D (a hole diameter) compared to the hole diameter D, adjusting the density with respect to the design space of the laser pattern 47-1.

Furthermore, the hole pitch P is applied equally to the left and right perforation hole formation section Lb and Lc to equalize the design of the laser pattern 47-1 at the left and right of the perforation hole unformed section La, forming symmetry, or is applied separately to the left perforation hole formation section Lb and the right perforation hole formation section Lc to differentiate the design of the laser pattern 47-1 at the left and right of the perforation hole unformed section La, forming asymmetry.

Figure 3:
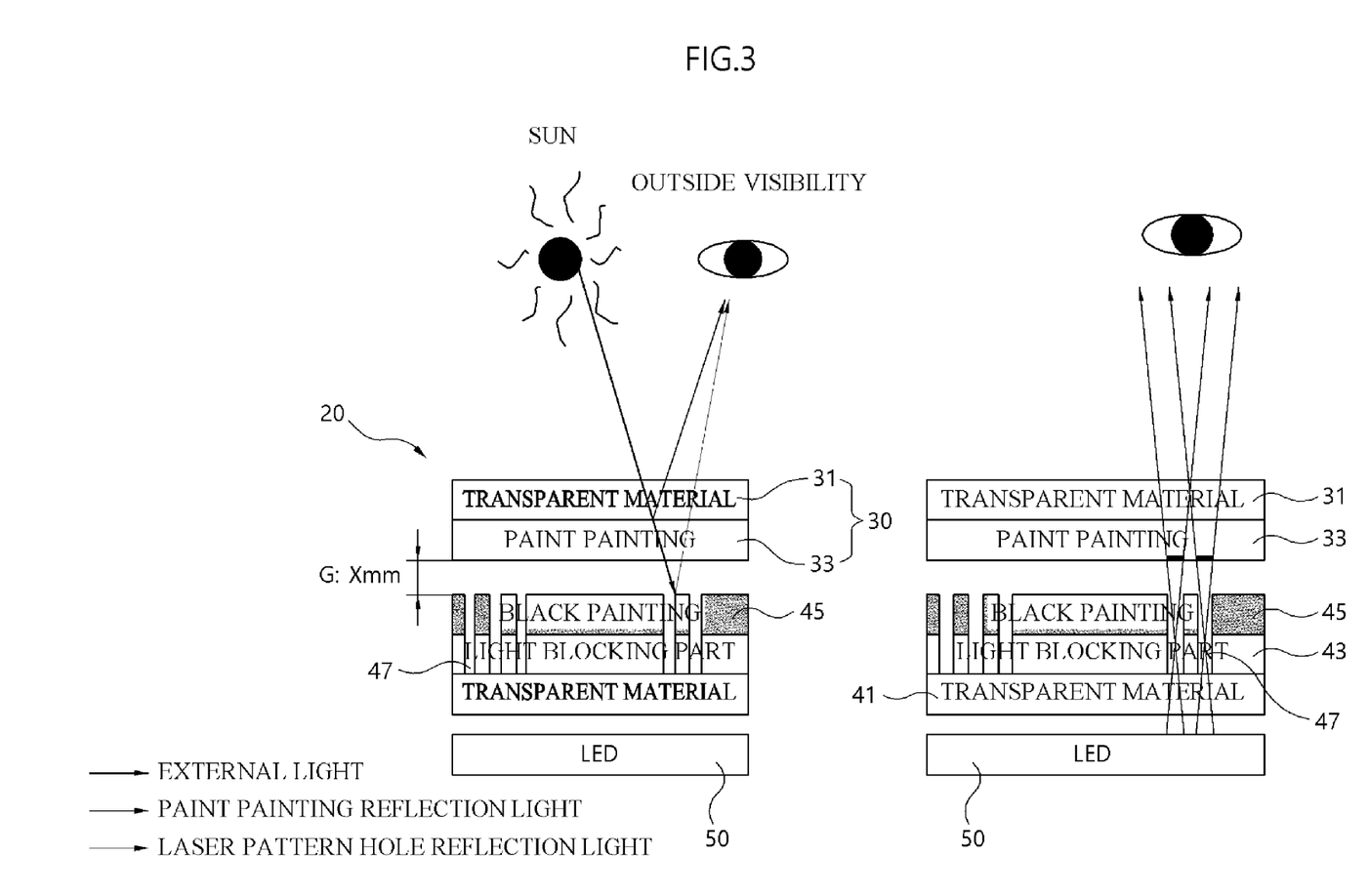
FIG. 3 is a diagram illustrating optimized example of an air gap of the light source module according to various exemplary embodiments of the present invention.
Figure 4:
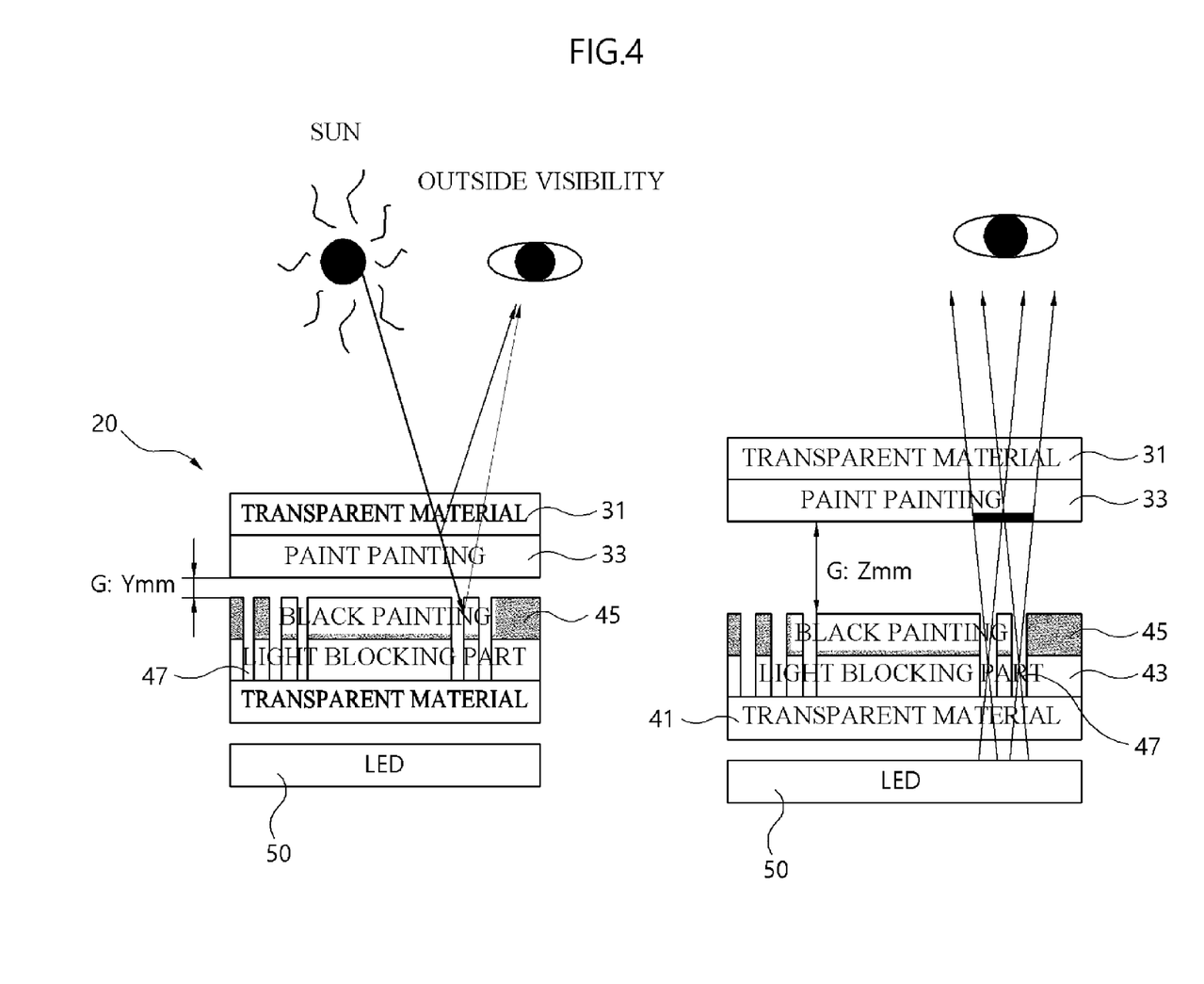
FIG. 4 is a diagram illustrating various modified examples of the air gap according to various exemplary embodiments of the present invention.

Meanwhile, FIG. 3 and FIG. 4 illustrate that the light source module 20 has an effect on the performance of blocking external light and transmitting internal light due to a change in setting space of the air gap G. In the instant case, it will be explained that the air gap G has an air gap optimum space "X" of about 1.23 mm, an air gap reduction space "Y" of about 0.5 mm, and an air gap expansion space "Z" of about 3 mm.

Referring to the air gap optimum space X applied to the air gap G of FIG. 3, it was proven experimentally that the air gap optimum space X substantially contributes to improving effect which the light source module 20 is not externally exposed by improving an inside blocking function (that is, a function to block external light from the sun) when the lighting source 50 is turned off, and at the same time, to improving visibility for the laser pattern of the light source module 20 by improving a light source lighting transmitting function (that is, a function to transmit internal light from the light source 50) when the light source 50 is turned on.

As an example, the internal blocking function is performed as follows: external light enters to the external lens 30 (for example, the sun), the external light passes through the transparent lens portion 31 to reach the penetrable painting portion 33, the external light is divided into a painting reflection light and penetration light at the boundary surface of the transparent lens portion 31 and the penetrable painting portion 33, the painting reflection light exiting from the boundary surface to the transparent lens portion 31 is recognized outside, the penetration light passes through the penetrable painting portion 33 from the boundary surface, the penetration light passes through the air gap optimum space X of the air gap G to reach the blocking painting portion 45 of the internal lens 40, the penetration light is absorbed by the blocking painting portion 45, and the laser pattern 47-1 of the laser perforation holes 47 is not recognized from outside. The above example is written according to the path of light.

In the present way, the air gap optimum space X of the air gap G allows the penetration light of the external light passing through the external lens 30 not to enter the laser perforation holes 47, but allows most of the penetration light be absorbed by the front surface (that is, A side of the black painting) of the blocking painting portion 45, making only the paint painting of the penetrable painting portion 33 reflecting the external light visible to the outside, which causes the external lens 30 to be recognized as a painting garnish the outside. In the instant case, the laser perforation holes 47 appear black matched with the black painting of the blocking painting portion 45 due to darkness caused by the light source 50 which is turned off, which increases an inside hiding effect of the light source module 20.

As an example, the light source lighting transmitting function is performed as follows: the internal light of the light source 50 enters to the internal lens 40 (for example, the light source 50 emits light), the internal light passes through the transparent lens portion 41 to reach the light blocking portion 43, the internal light is divided into a blocking reflection light of the light blocking portion 43 and hole penetration lights of a plurality of laser perforation holes 47, the hole penetration lights exiting from the blocking painting portion 45 through the laser perforation holes 47 pass through the air gap optimum space X of the air gap G to reach the external lens 30, the light which is reached the external lens 30 passes through the penetrable painting portion 33 and the transparent lens portion 31 to change into light visible outside, and the laser pattern 47-1 of the laser perforation holes 47 is recognized outside.

In the present way, the air gap optimum space X of the air gap G allows the penetration light of the internal light passing through the laser perforation holes 47 of the internal lens 40 to pass through the penetrable painting portion 33 and the transparent lens portion 31 without scattering, causing the boundary of the laser perforation holes 47 through which the internal light is transmitted, to be clear, which makes it possible to improve the laser pattern visibility effect that the laser pattern 47-1 appearing on the external lens 30 is clearly visible from outside.

On the other hand, referring to the air gap reduction space Y (a left drawing) applied to the air gap G of FIG. 4, due to the air gap reduction space (Y), the penetration light of the external light (for example, the sun) is not completely absorbed by the blocking painting portion 45 of the internal lens 40 and enters the laser perforation holes 47, so that the internal blocking function may be relatively weak when the light source is turned off, compared to the light path of the air gap optimum space X.

Therefore, the air gap reduction space Y makes the laser pattern 47-1 to blur so that a blurry internal projection effect occurs in a painting garnish effect recognized from outside.

Furthermore, referring to the air gap expansion space Z (a right drawing) applied to the air gap G of FIG. 4, due to the air gap expansion space Z, the penetration light of the internal light (for example, the lighting of light source 50) exists from the laser perforation holes 47 of the internal lens 40 to reach the penetrable painting portion 33 of the external lens 30, and thereafter scatters, so that a light concentration function may be relatively weak when the light source is turned on, compared to the light path of the air gap optimum space X.

Therefore, the air gap expansion space Z blurs boundary between the laser perforation holes 47 of the laser pattern 47-1, which causes a blurry hole boundary effect to occur in the laser pattern visibility effect which is visible from outside.

Figure 5:
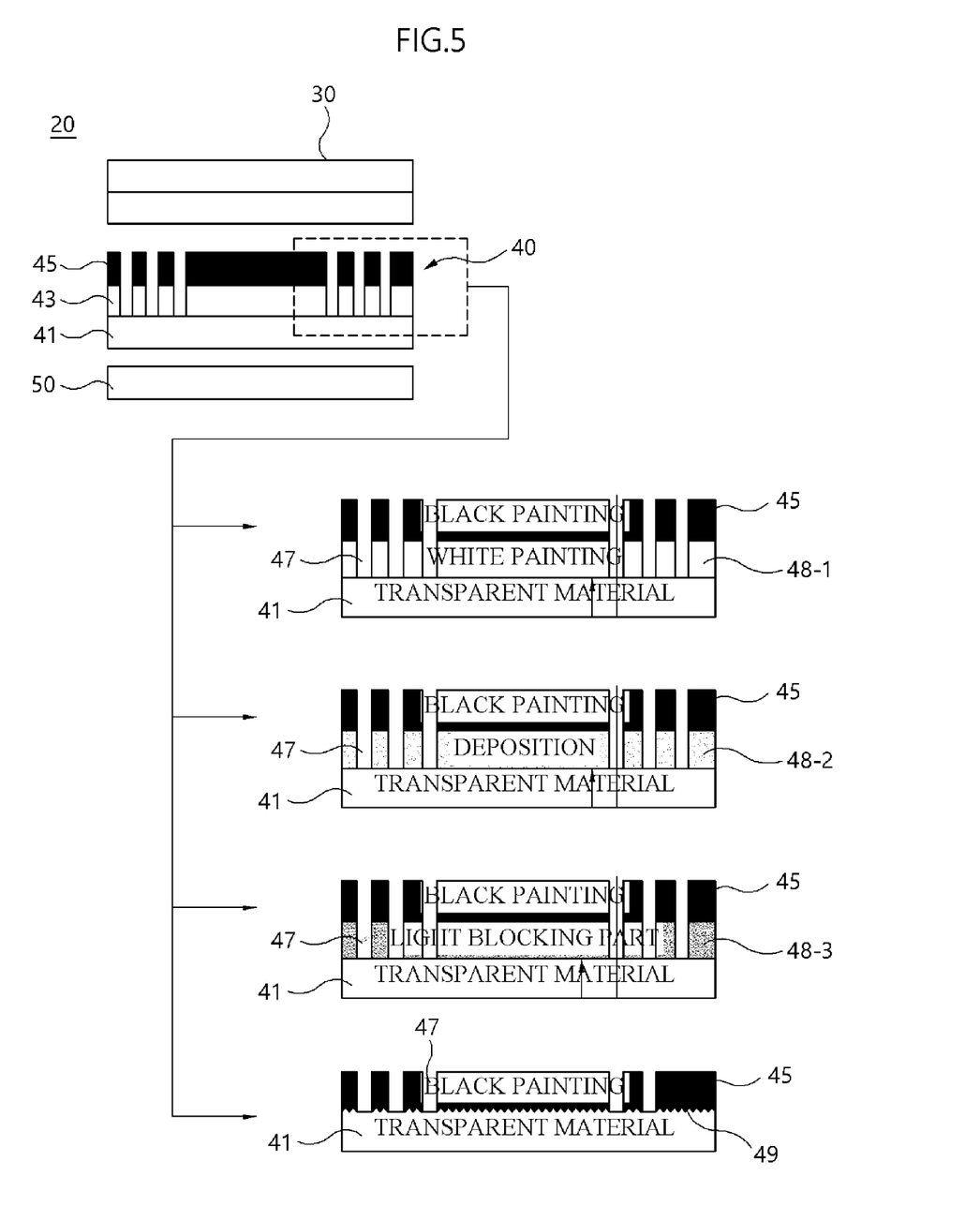
FIG. 5 is a diagram illustrating various modified examples of the light source module according to various exemplary embodiments of the present invention.

Meanwhile, FIG. 5 shows an example in which the internal lens 40 is variously modified in the light source module 20. In the instant case, the modification of the internal lens 40 is implemented in any one of a white painting portion 48-1, a light gray painting portion 48-2, a deposition portion 48-3, and a retro reflection portion 49, and the laser perforation holes 47 are processed in the modified portions of the internal lens 40, as in the light blocking portion 43.

As an example, the white painting portion 48-1 is located between the transparent lens portion 41 and the blocking painting portion 45 in place of the light blocking portion 43 and is included in the internal lens 40. Therefore, it is possible to change the laser pattern visibility effect by providing reflectivity different from internal light reflectivity of the light blocking portion 43 due to the white color of the white painting portion 48-1.

Furthermore, the light gray painting portion 48-2 is located between the transparent lens portion 41 and the blocking painting portion 45 in place of the light blocking portion 43 and is included in the internal lens 40. Therefore, it is possible to change the laser pattern visibility effect by providing reflectivity different from internal light reflectivity of the light blocking portion 43 due to a light gray color of the light gray painting portion 48-2

As an example, the deposition portion 48-3 is formed as a thin film by depositing a light reflection material on a front surface (or one side) of the transparent lens portion 41 using a deposition method, is located between the transparent lens portion 41 and the blocking painting portion 45 in place of the light blocking portion 43, and is included in the internal lens 40. Therefore, it is possible to change the laser pattern visibility effect by adjusting a film thickness of the deposition portion 48-3 more easily than that of the light blocking portion 43, and changing the internal light reflectivity with a variable thickness.

As an example, the retro reflection portion 49 is directly formed in a retro reflection structure or retro reflection shape on a front surface (or one side) of the transparent lens portion 41, and is included in the internal lens 40 together with the blocking painting portion 45. In the instant case, the retro reflection structure or the retro reflection shape may have a sawtooth structure or a wave structure.

Therefore, the retro reflection portion 49 may use the retro reflection structure or the retro reflection shape to more intensively collect the internal light into the laser perforation holes 47, further improving the laser pattern visibility effect and improving an internal light efficiency.

Meanwhile, FIG. 6 illustrates that the garnishless type hidden lamp 10 is operated as the garnishless type hidden lighting on the bumper 1-1 of the vehicle 1. In the instant case, the garnishless type hidden lamp 10 may be defined as a painting garnish hidden lamp because the garnish is implemented with a paint color applied to the penetrable painting portion 33 of the external lens 30.

As an example, when the light source 50 (see FIG. 1) is turned off, due to daytime driving of the vehicle 1, the light source module 20 implements the inside blocking function between the internal blocking function (see FIG. 3) and the light source light transmitting function (see FIG. 3).

That is, by the inside blocking function of the light source module 20 in the garnishless type hidden lamp 10, the external light reflected from the penetrable painting portion 33 of the external lens 30 and exiting from the transparent lens portion 31 is caused to be recognized by the outside, which causes the paint painting of the penetrable painting portion 33 to be recognized as a color of the transparent lens portion 31 when the paint painting is seen outside.

Therefore, when seen outside, the garnishless type hidden lamp 10 is recognized as the painting garnish due to the internal blocking function using the external lens 30.

On the other hand, when the light source 50 (see FIG. 1) is turned on due to night driving of the vehicle 1, the light source module 20 implements the light source lighting transmitting function between the internal blocking function (see FIG. 3) and the light source lighting transmitting function (see FIG. 3).

That is, by the light source light transmitting function of the light source module 20, the garnishless type hidden lamp 10 may cause the internal light exiting from the transparent lens portion 41 of the internal lens 40 to the laser perforation holes 47 of the light blocking portion 43 and the blocking painting portion 45, to be recognized from the outside thereof through the transparent lens portion 31 via the penetrable painting portion 33, which causes the laser pattern 47-1 of the laser perforation holes 47 to be recognized as the pattern of the transparent lens portion 31 when the laser pattern is seen outside.

Therefore, by the light source light transmitting function using the internal lens 40, the laser pattern 47-1 appearing at the boundary of the hole pitch P between the hole diameters D of the laser perforation holes 47 in the garnishless type hidden lamp 10 is recognized outside.

Accordingly, because the external lens 30 is configured as a painting garnish to form the outside exposure portion, the garnishless type hidden lamp 10 is a garnishless type hidden lighting which does not use the existing a metal garnish applied as the outside exposure portion.

As described above, the garnishless type hidden lamp 10 applied to the vehicle 1 according to the exemplary embodiment of the present invention includes the light source module 20, in which an internal lens spaced from an external lens 30, appearing as a garnish from outside thereof due to the color of a penetrable painting portion 33 which reflects the external light, with an air gap G interposed therebetween transmits an internal light of a light source 50 through laser perforation holes 47 to form a laser pattern 47-1 on the external lens 30.

Accordingly, the garnishless type hidden lamp 10 applied to the vehicle 1 may have the sense of unity with vehicle design by a painting garnish function of the external lens 30 without combination with a separate metal garnish, and prevents the light of the light source 50 from scattering from the external lens 30 using the air gap G as an air layer, so that it is possible to implement a wow effect of the painting garnish with the laser pattern 47-1 of the internal lens 40 clearly visible outside in the nighttime when the lamp is turned on, and to implement differentiated and customized lighting by only changing the laser pattern 47-1 without changing the appearance of the garnishless type hidden lamp 10.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A garnishless type hidden lamp, comprising:
   an external lens including a penetrable painting portion which reflects an external light so that the external lens looks like a garnish when seen outside thereof;
   an internal lens disposed adjacent to the external leans and including laser perforation holes which transmit an internal light to the external lens; and
   a light source configured to generate the internal light.

2. The garnishless type hidden lamp of claim 1, wherein the external lens and the internal lens are spaced from each other with an air gap interposed therebetween.

3. The garnishless type hidden lamp of claim 2,
   wherein the air gap is set to have an air gap optimum space, and
   wherein the air gap optimum space is a distance that prevents the external light penetrating the external lens from scattering from the laser perforation holes and prevents the internal light exiting from the laser perforation holes from scattering from the external lens.

4. The garnishless type hidden lamp of claim 3, wherein the air gap is set as an air gap reduction space shortened by the distance in the air gap optimum space or an air gap expansion space lengthened by the distance in the air gap optimum space.

5. The garnishless type hidden lamp of claim 4, wherein the air gap reduction space scatters a part of the external light in the laser perforation holes to blur a shape of the laser perforation holes on the external lens.

6. The garnishless type hidden lamp of claim 4, wherein the air gap expansion space scatters a part of the internal light exiting from the laser perforation holes to blur a design of the laser perforation holes on the external lens.

7. The garnishless type hidden lamp of claim 1,
wherein the external lens includes a transparent lens portion made of a transparent material and configured to form external visibility for the penetrable painting portion, and
wherein the transparent lens portion forms a boundary surface which is placed opposite to an external exposed surface onto which the external light is incident, between the penetrable painting portion and the transparent lens portion.

8. The garnishless type hidden lamp of claim 7, wherein paint color painting which transmits and reflects the external light is applied to the penetrable painting portion.

9. The garnishless type hidden lamp of claim 1, wherein the internal lens includes:
a transparent lens portion made of a transparent material and configured to transmit the internal light; and
a laser pattern portion disposed in the transparent lens portion and having the laser perforation holes processed as a laser pattern.

10. The garnishless type hidden lamp of claim 9,
wherein the laser pattern portion includes a light blocking portion and a blocking painting portion,
wherein the light blocking portion passes the internal light through the laser perforation holes while reflecting the internal light at a boundary surface formed between the transparent lens portion and the light blocking portion, and
wherein the blocking painting portion passes the internal light through the laser perforation holes while absorbing the internal light at a boundary surface formed between the light blocking portion and the blocking painting portion.

11. The garnishless type hidden lamp of claim 10,
wherein paint color painting which reflects the internal light is applied to the light blocking portion, and
wherein black painting which absorbs the internal light is applied to the blocking painting portion.

12. The garnishless type hidden lamp of claim 11, wherein the paint color painting is one of a black painting, a white painting, and a light gray painting.

13. The garnishless type hidden lamp of claim 10,
wherein the light blocking portion is formed on the transparent lens portion by deposition, and
wherein chromium (Cr) or aluminum (AL) is applied to the deposition.

14. The garnishless type hidden lamp of claim 1, wherein the internal lens includes:
a transparent lens portion made of a transparent material and configured to transmit the internal light;
a blocking painting portion disposed in the transparent lens portion and having the laser perforation holes processed as a laser pattern; and
a retro reflection portion positioned between the transparent lens portion and the blocking painting portion and configured to form a boundary surface.

15. The garnishless type hidden lamp of claim 14, wherein the retro reflection portion is integrally formed with the transparent lens portion.

16. The garnishless type hidden lamp of claim 1, wherein the plurality of laser perforation holes form a perforation row and form a laser pattern.

17. A vehicle including:
a garnishless type hidden lamp including a light source module, in which an internal lens spaced from an external lens, appearing as a garnish from outside thereof due to a color of a penetrable painting portion which reflects the external light, with an air gap interposed therebetween transmits an internal light of a light source through laser perforation holes, to form a laser pattern on the external lens, and a back cover configured to totally reflect the internal light from the inside of a lamp housing; and
a bumper having the garnishless type hidden lamp disposed thereon.

18. The vehicle of claim 17, wherein the garnishless type hidden lamp has a shape matched to a shape of the bumper.

19. The vehicle of claim 17,
wherein the external lens includes a transparent lens portion made of a transparent material and configured to form external visibility for the penetrable painting portion, and
wherein the transparent lens portion forms a boundary surface which is placed opposite to an external exposed surface onto which the external light is incident, between the penetrable painting portion and the transparent lens portion.

20. The vehicle of claim 17, wherein the internal lens includes:
a transparent lens portion made of a transparent material and configured to transmit the internal light; and
a laser pattern portion disposed in the transparent lens portion and having the laser perforation holes.

* * * * *